(12) United States Patent
Matsutani

(10) Patent No.: US 11,290,552 B2
(45) Date of Patent: Mar. 29, 2022

(54) MOBILE TERMINAL DEVICE SELECTIVELY OUTPUTTING PUSH NOTIFICATION

(71) Applicant: Brother Kogyo Kabushiki Kaisha, Nagoya (JP)

(72) Inventor: Tetsuro Matsutani, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 340 days.

(21) Appl. No.: 15/418,165

(22) Filed: Jan. 27, 2017

(65) Prior Publication Data

US 2017/0223127 A1      Aug. 3, 2017

(30) Foreign Application Priority Data

Jan. 28, 2016   (JP) .............................. JP2016-013937

(51) Int. Cl.
*H04L 29/08* (2006.01)
*H04N 1/00* (2006.01)
*H04L 67/55* (2022.01)
*H04M 1/72412* (2021.01)

(52) U.S. Cl.
CPC ......... *H04L 67/26* (2013.01); *H04N 1/00344* (2013.01); *H04N 1/00973* (2013.01); *H04M 1/72412* (2021.01); *H04N 2201/006* (2013.01); *H04N 2201/0017* (2013.01); *H04N 2201/0039* (2013.01); *H04N 2201/0075* (2013.01); *H04N 2201/3205* (2013.01)

(58) Field of Classification Search
CPC ...................................................... H04L 67/26
See application file for complete search history.

(56) References Cited

U.S. PATENT DOCUMENTS

| 6,622,266 B1* | 9/2003 | Goddard ............. G06F 11/0733 714/44 |
| 8,817,286 B2 | 8/2014 | Ishikawa |
| 2013/0124321 A1 | 5/2013 | Yamane et al. |
| 2013/0242325 A1* | 9/2013 | Ishikawa ............ H04N 1/00076 358/1.13 |

(Continued)

FOREIGN PATENT DOCUMENTS

| CN | 104461510 A | 3/2015 |
| JP | 2013-196273 A | 9/2013 |

(Continued)

OTHER PUBLICATIONS

Aug. 4, 2020—(JP) Office Action—App 2016-013937, Eng Tran.

*Primary Examiner* — Suraj M Joshi
(74) *Attorney, Agent, or Firm* — Banner & Witcoff, Ltd.

(57) ABSTRACT

A mobile terminal device includes a communication interface; a processor; and memory. The communication interface is configured to receive a push notification transmitted from a server. The memory stores device information and a set of computer-readable instructions therein. The device information specifies a specific device. The computer-readable instructions, when executed by the processor, causes the mobile terminal device to perform: determining whether a prescribed condition is met, the prescribed condition requiring that the push notification target a user of the specific device; and outputting the push notification in response to determining that the prescribed condition is met.

11 Claims, 11 Drawing Sheets

(56) References Cited

U.S. PATENT DOCUMENTS

2014/0333966 A1* 11/2014 Heemels ............... G06F 3/1204
358/1.15

FOREIGN PATENT DOCUMENTS

| JP | 2013-232242 A | 11/2013 |
| JP | 2014-007709 A | 1/2014 |
| WO | 2015-080138 A1 | 6/2015 |

* cited by examiner

| ENTRY | VALUE |
|---|---|
| MODEL NAME | XXX-YYYY |
| FIRMWARE VERSION | VER1.00 |
| REMAINING QUANTITIES OF INK | C=50%, M=60%, Y=70%, K=80% |
| REMAINING QUANTITY OF PAPER | A4, PLAIN PAPER, 80% |

MOBILE TERMINAL DEVICE SELECTIVELY OUTPUTTING PUSH NOTIFICATION

CROSS REFERENCE TO RELATED APPLICATION

This application claims priority from Japanese Patent Application No. 2016-013937 filed on Jan. 28, 2016. The entire content of the priority application is incorporated herein by reference.

TECHNICAL FIELD

The present disclosure relates to a non-transitory computer readable storage medium storing a computer program that processes push notifications.

BACKGROUND

A framework that enables notifications of certain types to be transmitted to an application program on a mobile terminal device, even when the application program is not running, is well known in the art. Such notifications will be called "push notifications" in the following description.

In the conventional framework for push notifications, all push notifications received by the mobile terminal device are outputted on the mobile terminal device itself (through a message displayed on the screen or an emitted sound). However, some of the push notifications received by the mobile terminal device may have low relevance or urgency to the user of the device. Thus, with the conventional system there is a chance that push notifications will become an annoyance to the user, leading to relevant or urgent push notifications going unnoticed by the user.

A technology was disclosed for more efficiently notifying users of mobile terminal devices about events. With this technology, the mobile terminal device monitors its location information, tracks its travel speed and direction, sets an event search area based on the location information and travel speed and direction, selects event notifications for events occurring within the event search area, and records these event notifications in a notification list (see Japanese Patent Application Publication No. 2014-7709, for example).

SUMMARY

Recent years have seen widespread use of technologies that install an application program on the mobile terminal device and that control the mobile terminal device through the application program running on the device. When push notifications are transmitted to this type of application program, the program may output even notifications having low relevance or urgency to the user of the mobile terminal device when the push notifications are selected based solely on the location information for the mobile terminal device, as in the conventional technology described above.

In order to resolve the conventional program described above at least partially, it is an object of the present disclosure to provide a technology for enabling an application program controlling a device to selectively output only push notifications having high relevance or urgency to the user of the device.

In order to attain the above and other objects, the present disclosure provides a non-transitory computer readable storage medium storing a set of program instructions for a mobile terminal device. The mobile terminal device includes: a communication interface; a computer; and a memory. The memory stores an operating system. The operating system is configured to cause the mobile terminal device to perform receiving a push notification transmitted from a server via the communication interface. The set of program instructions, when executed by the computer, causes the mobile terminal device to perform: determining whether a prescribed condition is met, the prescribed condition including a first condition, the first condition requiring that the push notification target a user of a specific device specified by device information stored in the memory; and outputting the push notification in response to determining that the prescribed condition is met.

According to another aspect, the present disclosure provides a mobile terminal device. The mobile terminal device includes a communication interface; a processor; and a memory. The communication interface is configured to receive a push notification transmitted from a server. The memory stores device information and a set of computer-readable instructions therein. The device information specifies a specific device. The set of computer-readable instructions, when executed by the processor, causes the mobile terminal device to perform: determining whether a prescribed condition is met, the prescribed condition requiring that the push notification target a user of the specific device; and outputting the push notification in response to determining that the prescribed condition is met.

BRIEF DESCRIPTION OF THE DRAWINGS

The particular features and advantages of the disclosure as well as other objects will become apparent from the following description taken in connection with the accompanying drawings, in which.

DETAILED DESCRIPTION

A. Embodiment

A-1. Structure of an Information Processing System

Figure 1:
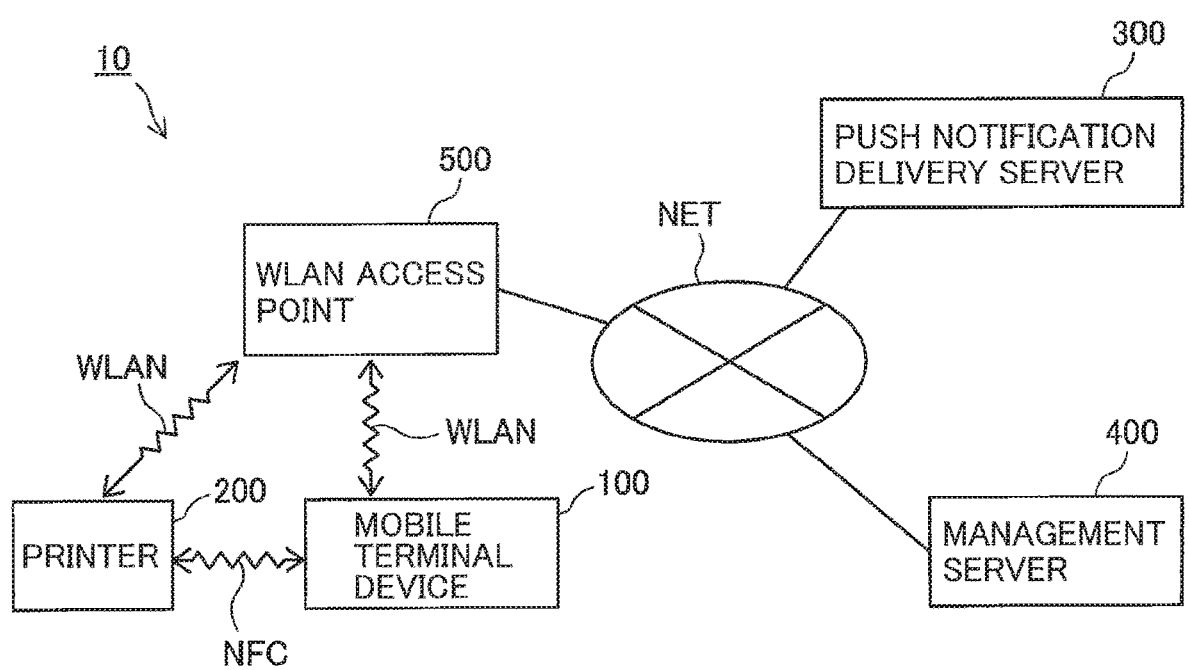
FIG. 1 is a schematic diagram showing structure of an information processing system according to one embodiment.

FIG. 1 is a schematic diagram showing the structure of an information processing system 10 according to the present embodiment. The information processing system 10 includes a mobile terminal device 100, a printer 200 having an inkjet or electro-photographic system, a push notification delivery server 300, and a management server 400. All of these devices are interconnected and capable of communicating with each other. For example, the mobile terminal device 100 can communicate with the printer 200 over a wireless local area network (hereinafter abbreviated as "WLAN") implemented by a WLAN access point 500, or through near field communication (NFC). The mobile terminal device 100 can also communicate with the push notification delivery server 300 through a network NET, such as the Internet. The push notification delivery server 300 can also communicate with the management server 400 over the network NET.

Figure 2:
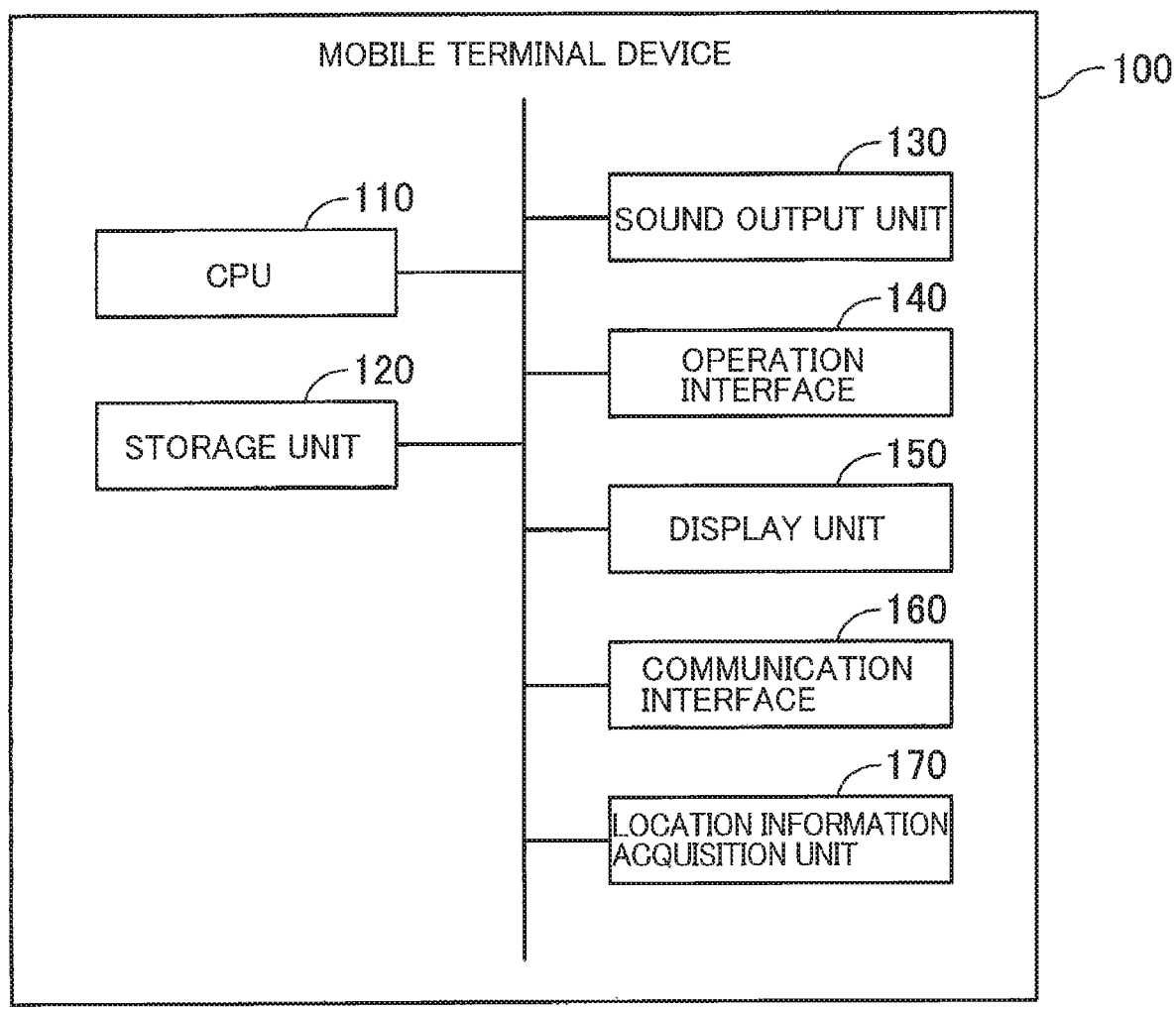
FIG. 2 is a block diagram showing structure of an mobile terminal device according to the embodiment.

The mobile terminal device 100 is a portable information processor, such as a smartphone or a tablet device. As shown in FIG. 2, the mobile terminal device 100 includes a CPU 110, a storage unit 120, a sound output unit 130, an operation interface 140, a display unit 150, a communication interface 160, and a location information acquisition unit 170. The operation interface 140 receives operations from the user and may be configured of a touch screen provided over a liquid crystal display, and buttons, switches, and the like. The sound output unit 130 may be configured of a speaker or the like for outputting sound. The display unit 150 displays images and information and may be configured of the touchscreen provided on the liquid crystal display described above, and the like. The communication interface 160 may be configured of a WLAN interface and an NFC interface, for example, for communicating with other devices. The communication interface 160 is an example of the claimed communication interface. The location information acquisition unit 170 may be configured of a Global Positioning System (GPS) receiver or the like that acquires location information identifying the position of the mobile terminal device 100.

The storage unit 120 of the mobile terminal device 100 is configured of ROM, RAM, and the like, for example. The storage unit 120 stores various data and programs and may be used both as a work area when the CPU 110 executes the various programs, and a temporary storage area for storing data. The programs stored in the storage unit 120 may include an operating system (hereinafter abbreviated as "OS") and application programs (hereinafter simply called "applications"), for example. In the present embodiment, the applications stored in the storage unit 120 include an application for controlling the printer 200 (hereinafter called the "printer control application"). The storage unit 120 is an example of the claimed memory.

The CPU 110 of the mobile terminal device 100 controls each component of the mobile terminal device 100 by executing programs read from the storage unit 120. For example, the CPU 110 controls the printer 200 by executing the printer control application and performs a process for received push notifications described later (S56 of FIG. 3). The printer 200 controlled by the mobile terminal device 100 is an example of the claimed specific device. The CPU 110 of the mobile terminal device 100 is an example of the claimed computer.

A-2. Push Notification Delivery and Outputting Process

Figure 3:
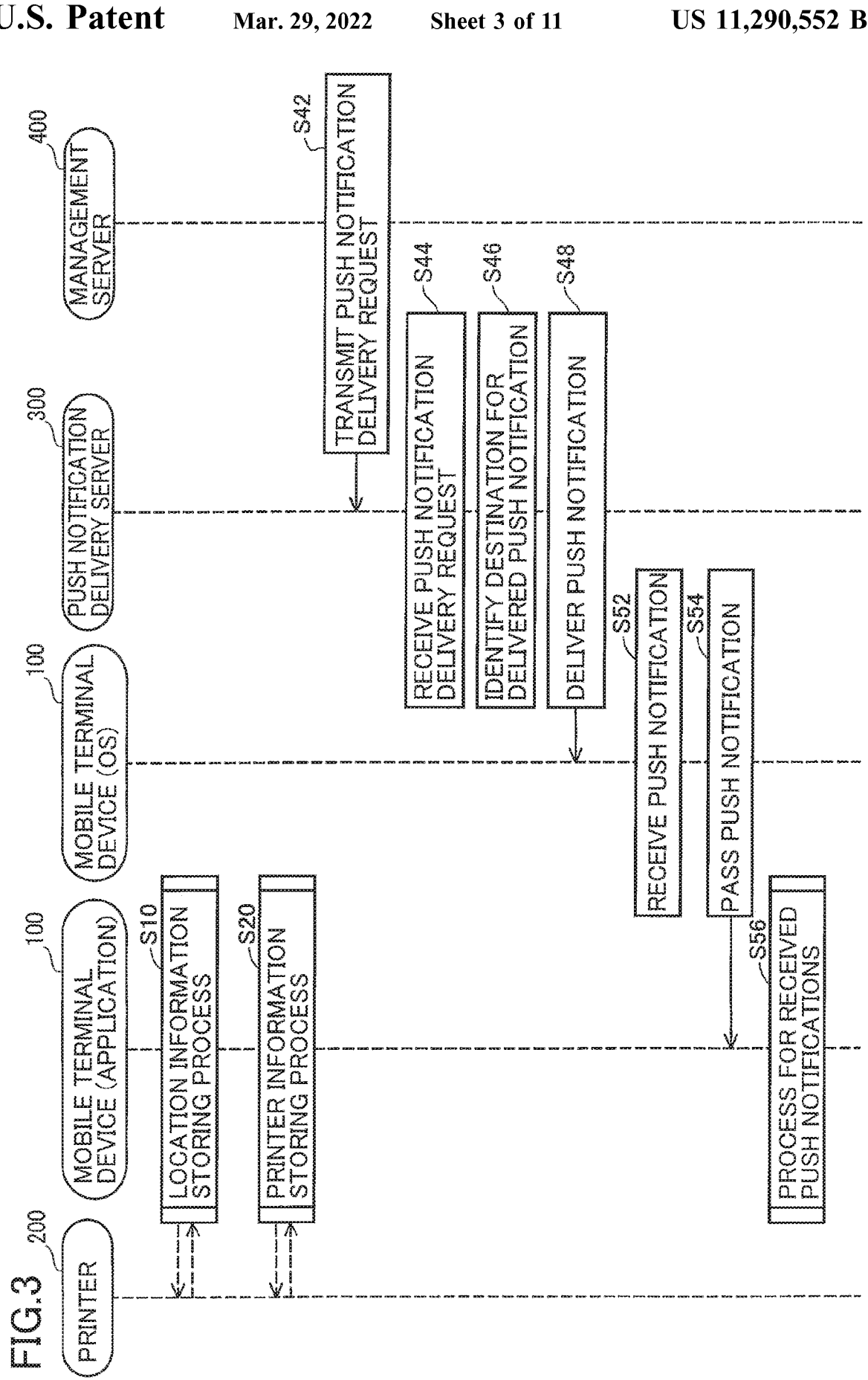
FIG. 3 is an explanatory diagram showing a process flow in a push notification delivery and outputting process implemented on the information processing system.

FIG. 3 is an explanatory diagram showing the process flow in a push notification delivery and outputting process implemented on the information processing system 10 shown in FIG. 1. In this process, the push notification delivery server 300 delivers a push notification to the mobile terminal device 100 in response to a request from the management server 400, and the mobile terminal device 100 presents the content of the push notification to the user when prescribed outputting conditions are met. Here, a push notification is a notification transmitted to the application and processed by the application, even when the application is not running on the mobile terminal device 100 at the time. The push notification delivery and outputting process will be described next using a push notification transmitted to the printer control application as an example.

In the push notification delivery and outputting process of the present embodiment shown in FIG. 3, the mobile terminal device 100 executes a location information storing process in S10 and a printer information storing process in S20 as standard processes.

A-2-1. Location Information Storing Process

Figure 4:
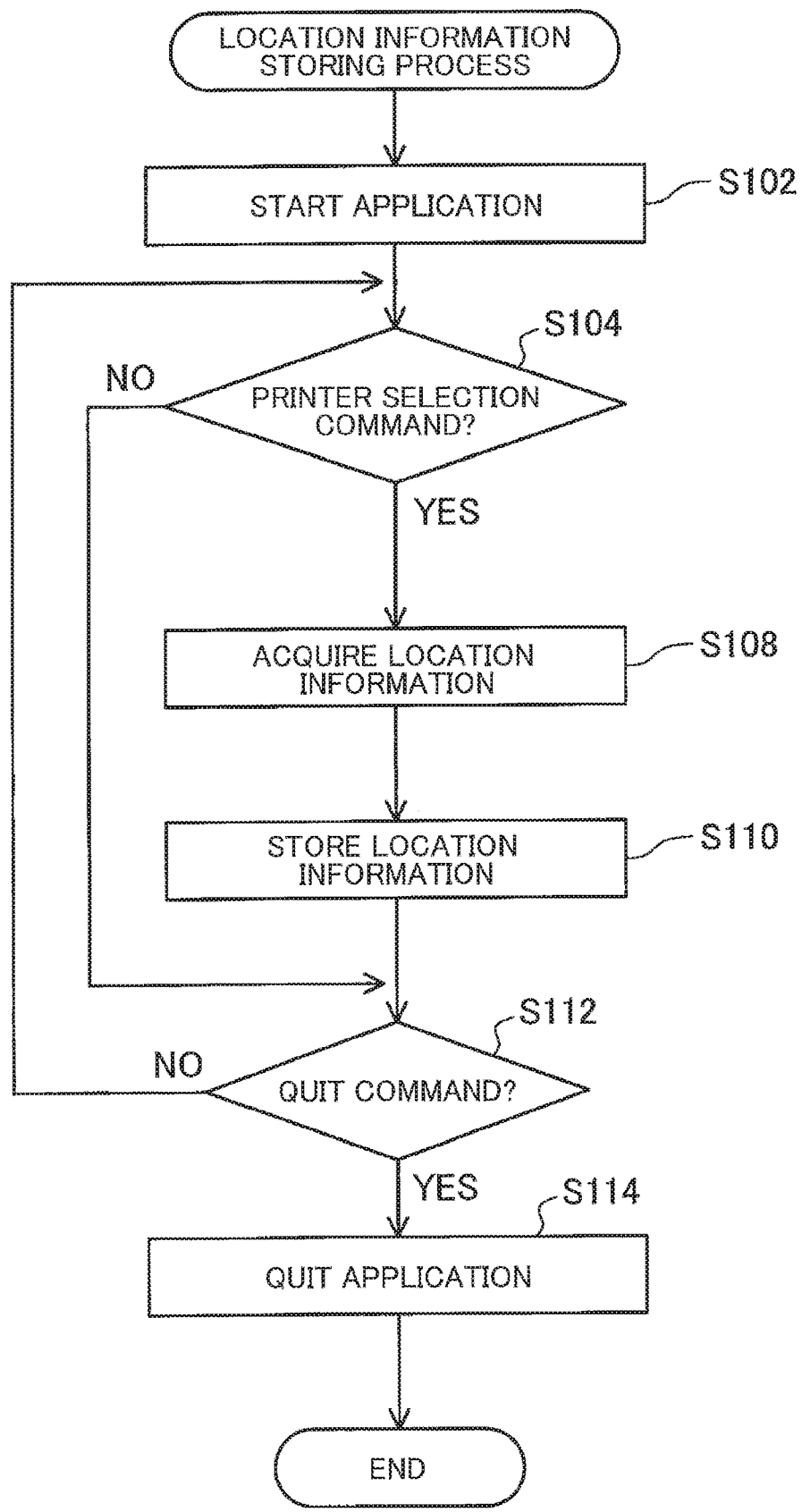
FIG. 4 is a flowchart illustrating steps in a location information storing process executed by the mobile terminal device.

FIG. 4 is a flowchart illustrating steps in the location information storing process. The mobile terminal device 100 begins this process upon acquiring a command via the operation interface 140 to start the printer control application, for example.

In S102 at the beginning of the process, the CPU 110 of the mobile terminal device 100 starts the printer control application. In S104 the mobile terminal device 100 determines whether a printer selection command was acquired. A printer selection command may be acquired when the user of the mobile terminal device 100 performs a prescribed operation on the operation interface 140 or when the mobile terminal device 100 is tapped against the printer 200 while communicating with the printer 200 through NFC.

If the CPU 110 determines in S104 that a printer selection command was acquired (S104: YES), in S108 the CPU 110 controls the location information acquisition unit 170 to acquire location information identifying the position of the mobile terminal device 100, and in S110 stores the acquired location information in the storage unit 120. As described above, the mobile terminal device 100 and printer 200 communicate with each other through WLAN and NFC in the present embodiment. Accordingly, the mobile terminal device 100 may be assumed to be relatively close in position to the printer 200 when a selection command for the printer 200 is acquired. Accordingly, the position of the mobile terminal device 100 identified by the acquired location information is likely a position close to the printer 200.

After storing the location information in S110 or when the CPU 110 determines in S104 that a printer selection command was not acquired (S104: NO), in S112 the CPU 110 determines whether a command to quit the printer control application was acquired via the operation interface 140. If the CPU 110 determines that a quit command was not acquired (S112: NO), the CPU 110 returns to the process in S104 for determining whether a printer selection command has been acquired and continues the process described above. However, when the CPU 110 determines that a quit command was acquired (S112: YES), in S114 the CPU 110 quits the printer control application and ends the current location information storing process.

Thus, in the location information storing process of FIG. 4, the CPU 110 performs processes to acquire and store location information when a printer selection command is acquired while the printer control application is running.

A-2-2. Printer Information Storing Process

Figure 5:
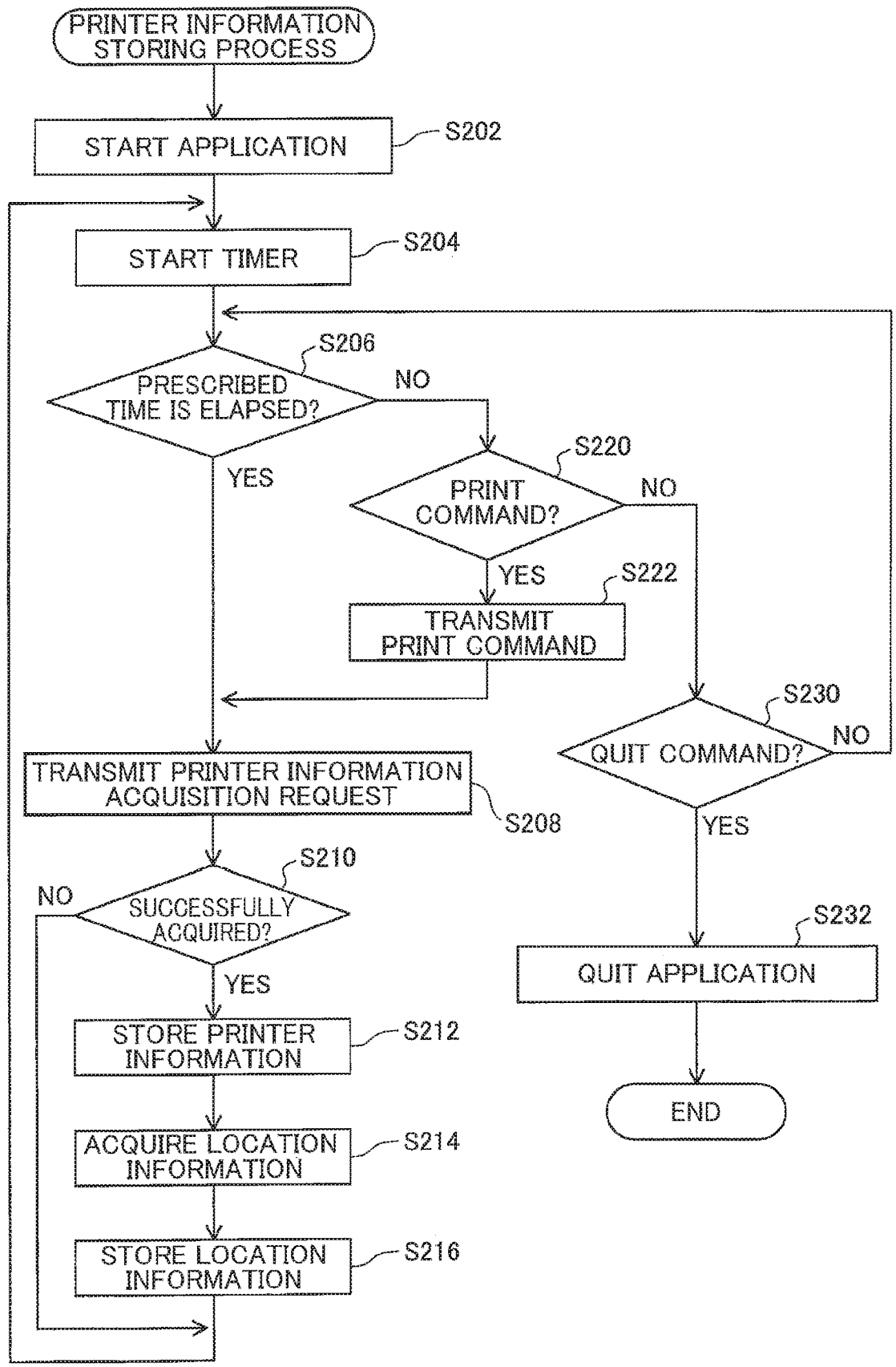
FIG. 5 is a flowchart illustrating steps in a printer information storing process executed by the mobile terminal device.

FIG. 5 is a flowchart illustrating steps in the printer information storing process executed by the mobile terminal device 100. The mobile terminal device 100 starts this process upon acquiring a command to start the printer control application via the operation interface 140, for example. Thus, the printer information storing process described next is executed in parallel with the location information storing process described above while the printer control application is running.

In S202 at the beginning of the printer information storing process, the CPU 110 of the mobile terminal device 100 starts the printer control application. In S204 the CPU 110 starts a timer and in S206 determines whether a prescribed time has elapsed since the timer was started.

Figure 6:
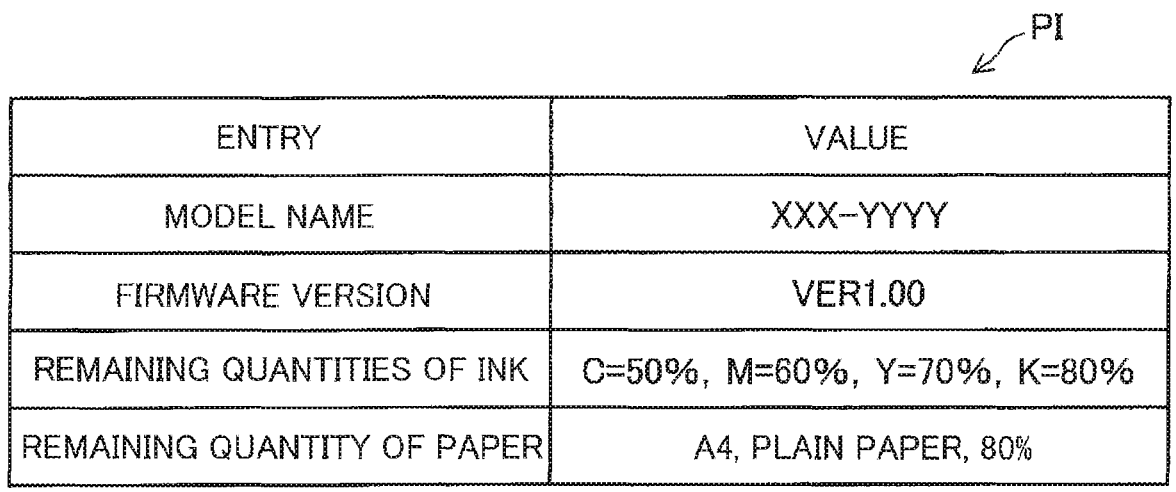
FIG. 6 is an explanatory diagram showing an example of printer information.

If the CPU 110 determines that the prescribed time has elapsed (S206: YES), in S208 the CPU 110 transmits a request via the communication interface 160 to the printer 200 selected in S104 of the location information storing process described above (FIG. 4) to acquire printer information PI. The printer information PI is information about the printer 200. FIG. 6 is an explanatory diagram showing an example of the printer information PI. As shown in FIG. 6, the printer information PI includes information specifying the model name of the printer 200, the firmware version of the printer 200, the remaining quantities of ink (or toner), and the remaining quantity of paper. The firmware of the printer 200 includes a function for transmitting the printer information PI to the mobile terminal device 100 upon receiving a printer information acquisition request from the mobile terminal device 100.

In S210 the CPU 110 determines whether printer information PI was successfully acquired (received). When the CPU 110 determines that the printer information PI was successfully acquired (S210: YES), in S212 the CPU 110 stores the acquired printer information PI in the storage unit 120. Next, in S214 the CPU 110 controls the location information acquisition unit 170 to acquire location information identifying the position of the mobile terminal device 100 when the printer information PI was received, and in S216 stores the location information in the storage unit 120 in association with the printer information PI. As described above, the mobile terminal device 100 and printer 200 can communicate through WLAN and NFC in the present embodiment. Hence, it may be assumed that the mobile terminal device 100 is positioned relatively close to the printer 200 when the mobile terminal device 100 successfully acquires printer information PI from the printer 200. Accordingly, the position of the mobile terminal device 100 identified by the location information acquired in S214 is likely near the position of the printer 200. The location information acquired at this time is an example of the claimed first location information. After completing the process in S216, the CPU 110 returns to S204 and restarts the timer. On the other hand, if the CPU 110 determines in S210 that printer information PI was not successfully acquired (S210: NO), the CPU 110 skips the processes in S212 through S216 and returns to S204.

Before the prescribed time has elapsed since the CPU 110 started the timer in S204 (S206: NO), in S220 the CPU 110 determines whether a print command was acquired via the operation interface 140. If the CPU 110 determines that a print command was acquired (S220: YES), in S222 the CPU 110 transmits a print command to the control target (the printer 200 in this example) via the communication interface 160. As a result, the printer 200 executes a printing process based on the print command received from the mobile terminal device 100. After transmitting the print command in S222, the CPU 110 executes the processes from S208 to S216 (processes to acquire and store the printer information PI and the location information) as described above. Note that the printer information PI described above includes information that may change as printing is executed, such as information indicating the remaining quantities of ink and paper. Since the processes for acquiring and storing the printer information PI are executed after the print command is transmitted in S222 of the present embodiment, the mobile terminal device 100 can update the printer information PI to the latest information to improve the accuracy of the printer information PI. After completing the process in S216, the CPU 110 returns to S204 and restarts the timer.

If a print command was not acquired before the prescribed time has elapsed after the CPU 110 started the timer in S204 (S206: NO, S220: NO), in S230 the CPU 110 determines whether a command was acquired via the operation interface 140 for quitting the printer control application. If the CPU 110 determines that a quit command was not acquired (S230: NO), the CPU 110 returns to S206 to determine whether the prescribed time has elapsed since the timer was started and continues the process described above. If the CPU 110 determines that a quit command was acquired (S230: YES), in S232 the CPU 110 quits the printer control application and ends the printer information storing process.

As described above in the printer information storing process of FIG. 5, the mobile terminal device 100 performs processes to acquire and store printer information PI each time the prescribed time has elapsed as long as the printer control application is running. Further, the mobile terminal device 100 performs processes to acquire and store the printer information PI when a printer command is acquired.

A-2-3. Process Flow for Push Notification Delivery

Next, steps in a push notification delivery process flow performed on the information processing system 10 will be described with reference to FIG. 3. In this example, the administrator of the management server 400 wishes to distribute a push notification to every terminal device having the printer control application installed thereon. In S42 the administrator instructs the management server 400 to transmit a push notification delivery request to the push notification delivery server 300. This request includes the content of the push notification, as well as the server API key, registration IDs, and outputting conditions.

The server API key is information that identifies the printer control application. The registration IDs are information identifying the destinations of the distributed push notification (each terminal device on which the printer control application is installed in this example). The server API key and a project ID are issued to the management server 400 when the administrator of the management server 400 wishing to distribute a push notification registers a project on the push notification delivery server 300 or another server. The management server 400 then embeds the project ID in the printer control application prior to providing the application to the terminal devices. When installing the printer control application, a terminal device transmits a request to the push notification delivery server 300 for the push notification delivery server 300 to issue a registration ID. The request includes the project ID embedded in the printer control application. In response to this request, the push notification delivery server 300 issues a registration ID to the terminal device and stores the registration ID in association with the server API key. Upon receiving the registration ID, the terminal device notifies the management server 400 of the registration ID, and the management server 400 stores the registration ID in association with the server API key. In this way, registration IDs are stored with the server API key on the management server 400. When issuing the push notification delivery request described above, the management server 400 includes the server API key and registration IDs stored as described above. The outputting conditions will be described later.

In S44 the push notification delivery server 300 receives the push notification delivery request from the management server 400 and authenticates the management server 400 based on the API key included in the push notification delivery request. When authentication is successful, in S46 the push notification delivery server 300 identifies the terminal devices to which the push notification is to be delivered based on the registration IDs included in the push notification delivery request, and in S48 delivers the push notification to the terminal devices identified in S46. Note that the push notification includes information specifying the application, and information specifying the outputting conditions.

In this example, the mobile terminal device 100 serves as a destination for the delivered push notification. In S52 the CPU 110 of the mobile terminal device 100 receives the push notification from the push notification delivery server 300 according to a function implemented by the OS. In S54 the CPU 110 passes the push notification to the application specified in the notification (the printer control application in this example). Subsequently, in S56 the CPU 110 of the mobile terminal device 100 executes the process for received push notifications described below according to a function implemented by the printer control application.

A-2-4. Process for Received Push Notifications

Figure 7:
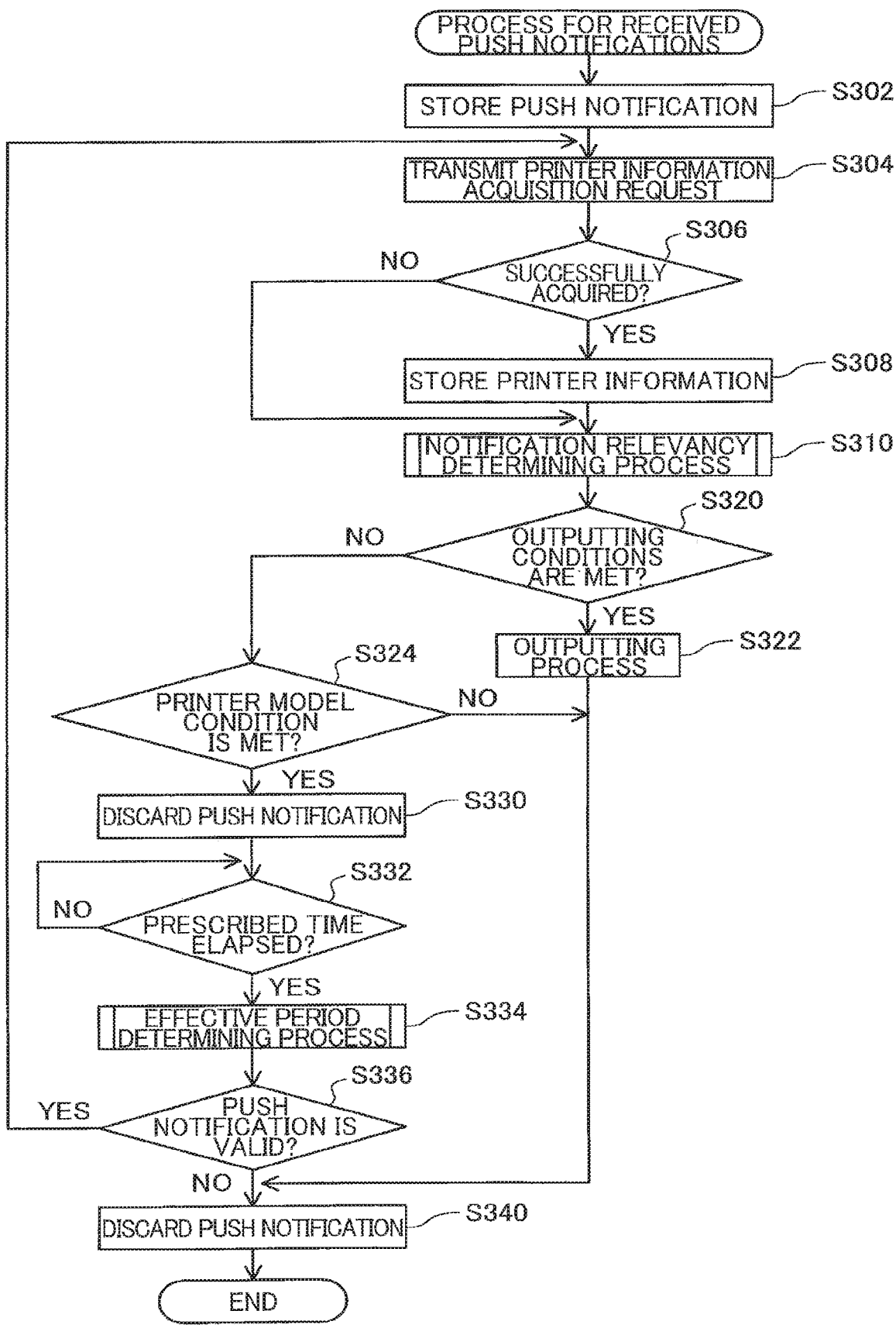
FIG. 7 is a flowchart illustrating steps in a process for received push notifications executed by the mobile terminal device.

FIG. 7 is a flowchart illustrating steps in the process for received push notifications executed by the mobile terminal device 100. In S302 at the beginning of this process, the CPU 110 of the mobile terminal device 100 stores the received push notification in the storage unit 120. In S304 the CPU 110 transmits a request to acquire printer information PI to the printer 200 via the communication interface 160. The printer information acquisition request is identical to the request transmitted in S208 of the printer information storing process described in FIG. 5. In S306 the CPU 110 determines whether printer information PI was successfully acquired (received). If the CPU 110 determines that printer information PI was successfully acquired (S306: YES), in S308 the CPU 110 stores the printer information PI in the storage unit 120. At this time, the printer information PI currently stored in the storage unit 120 is updated to the latest printer information PI. However, the mobile terminal device 100 may be unable to acquire printer information PI from the printer 200, such as when the CPU 110 is positioned too far away from the printer 200 or is incapable of communicating with the printer 200. If the CPU 110 determines that printer information PI was not successfully acquired (S306: NO), the CPU 110 skips the process in S308 described above. In this case, the printer information PI previously stored in the storage unit 120 remains unchanged.

Next, the CPU 110 executes a notification relevancy determining process in S310 to reference the printer information PI in order to determine whether to output the push notification stored in the storage unit 120. In the present embodiment, the mobile terminal device 100 does not output a push notification unconditionally upon receipt of a notification, but only outputs the push notification when outputting conditions described below have been met. With this method, the mobile terminal device 100 can selectively output push notifications having a high relevance or urgency to the user at a suitable timing, thereby reducing the user's feeling of annoyance at push notifications while simultaneously preventing the user from overlooking push notifications with high relevance or urgency. This aspect will be described later in greater detail.

Figure 8:
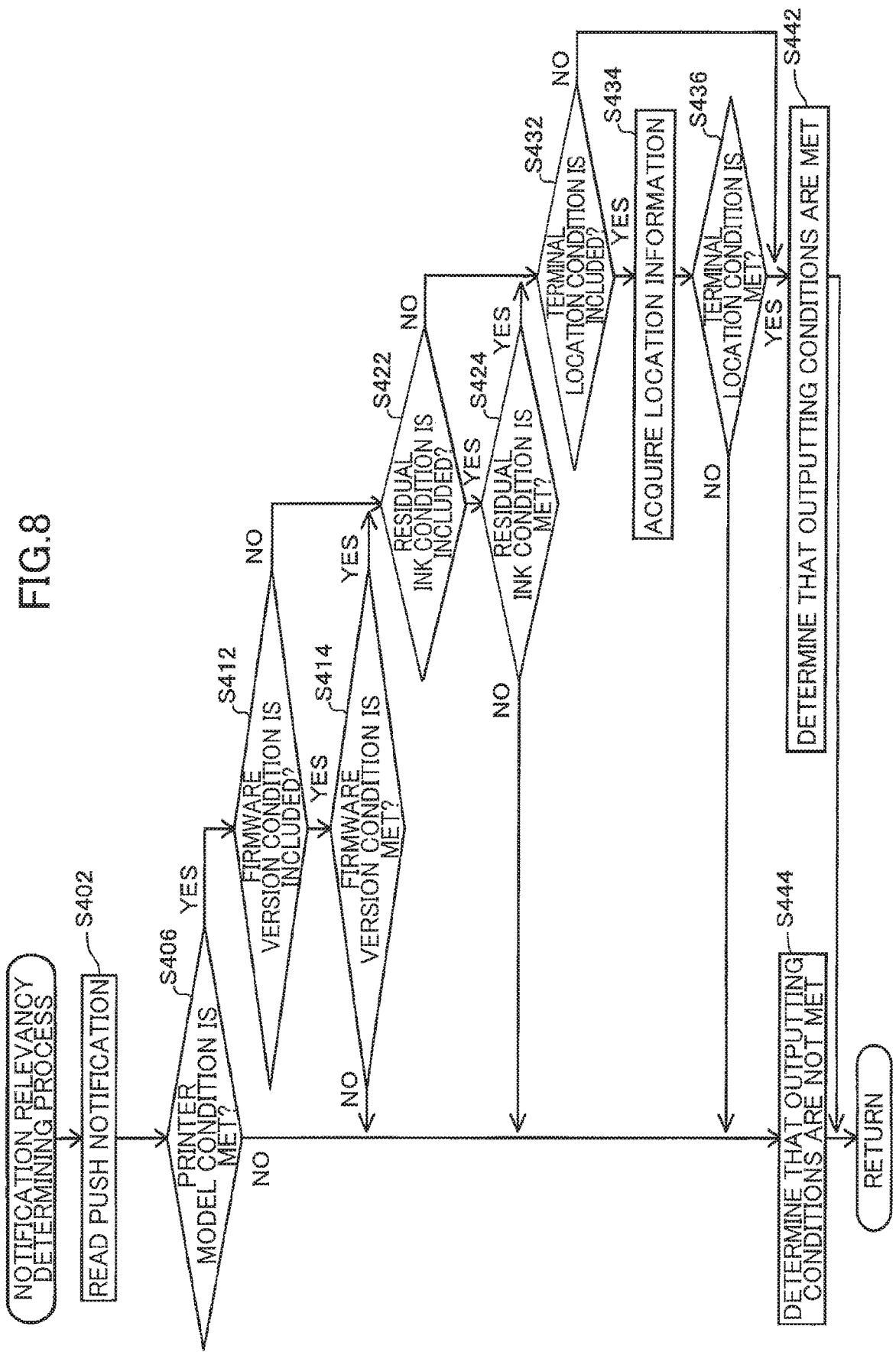
FIG. 8 is a flowchart illustrating steps in a notification relevancy determining process executed by the mobile terminal device.

FIG. 8 is a flowchart illustrating steps in the notification relevancy determining process. In S402 at the beginning of this process, the CPU 110 reads the push notification stored in the storage unit 120. As described above, a push notification in the present embodiment includes information specifying outputting conditions. The outputting conditions are used for determining whether or not to output the push notification. The outputting conditions include at least a printer model condition. The printer model condition requires that the model of the target printer 200 match a specific model as an outputting condition for push notifications. For example, when the push notification being delivered involves a sale (bargain event) on consumables (ink or paper, for example) that can be used in the printer 200, the printer models capable of using the consumable are specified in the printer model condition. As another example, if the push notification is introducing a new printer, the printer model condition will specify printer models that were released at least a prescribed number of years earlier.

The outputting conditions may also include a firmware version condition, a residual ink condition, and a terminal location condition. The firmware version condition requires that the current firmware version of the target printer 200 correspond to a specific version as an outputting condition for the push notification. For example, when the push notification concerns an update to the firmware version, the firmware version condition specifies versions of the firmware that require the update. The residual ink condition requires that the amount of ink remaining in the target printer 200 be low (low enough that a near empty warning has been issued, for example) as an outputting condition for the push notification. The outputting conditions include the residual ink condition when the push notification involves a sale on ink, for example. The terminal location condition requires that the mobile terminal device 100 be positioned near the target printer 200 as an outputting condition for the push notification. The outputting conditions include a terminal location condition if it is desirable to output the push notification when the mobile terminal device 100 is positioned near the printer 200.

In S406 the CPU 110 of the mobile terminal device 100 determines whether the printer model condition is met by referencing the model name entry in the printer information PI stored in the storage unit 120 (see FIG. 6). If the CPU 110 determines that the printer model condition is not met (S406: NO), in S444 the CPU 110 determines that the outputting conditions are not met.

However, if the printer model condition is met (S406: YES), in S412 the CPU 110 determines whether the outputting conditions include a firmware version condition. If the CPU 110 determines that a firmware version condition is included in the outputting conditions (S412: YES), in S414 the CPU 110 determines whether the firmware version condition is met by referencing the firmware version entry in the printer information PI stored in the storage unit 120. If the CPU 110 determines that the firmware version condition is not met (S414: NO), in S444 the CPU 110 determines that the outputting conditions are not met.

On the other hand, if the CPU 110 determines that the outputting conditions do not include a firmware version condition (S412: NO) or if the CPU 110 determines that the firmware version condition is satisfied (S414: YES), in S422 the CPU 110 determines whether the outputting conditions include a residual ink condition. If the CPU 110 determines that a residual ink condition is included in the outputting conditions (S422: YES), in S424 the CPU 110 determines whether the residual ink condition is satisfied by referencing the residual ink entry in the printer information PI stored in the storage unit 120. If the CPU 110 determines that the residual ink condition is not satisfied (S424: NO), in S444 the CPU 110 determines that the outputting conditions are not met.

However, if the CPU 110 determines that the outputting conditions do not include a residual ink condition (S422: NO) or if the CPU 110 determines that the residual ink condition is met (S424: YES), in S432 the CPU 110 determines whether the outputting conditions include a terminal location condition. If the CPU 110 determines that the outputting conditions include a terminal location condition (S432: YES), in S434 the CPU 110 controls the location information acquisition unit 170 to acquire location information specifying the position of the mobile terminal device 100, and in S436 determines whether the terminal location condition is met. Note that the location information acquired at this time is an example of the claimed second location information. Specifically, the CPU 110 determines whether the distance between the position of the mobile terminal device 100 identified by the location information acquired in S434 (the second location information) and the position specified in location information that was stored in the storage unit 120 in S216 of the printer information storing process shown in FIG. 5 (the first location information) is no greater than a prescribed value. If the CPU 110 determines that the terminal location condition is not satisfied, i.e., that the distance between the two positions is greater than the prescribed value (the positions are too far apart; S436: NO), in S444 the CPU 110 determines that the outputting conditions are not met. On the other hand, if the CPU 110 determines that the outputting conditions do not include a terminal location condition (S432: NO) or if the CPU 110 determines that the terminal location condition is met (S436: YES), in S442 the CPU 110 determines that the outputting conditions have been met.

Thus, through the notification relevancy determining process of FIG. 8, the CPU 110 of the mobile terminal device 100 determines that the outputting conditions are satisfied when all conditions included in the outputting conditions have been met and determines that the outputting conditions are not satisfied when even one of the outputting conditions is not met.

One of the examples of printer model conditions described above specifies printer models capable of using a specific consumable. This printer model condition requires that the push notification target users of the printer 200 identified by the printer information PI stored in the storage unit 120 and that the push notification be relevant to the model of the printer 200 identified by the printer information PI stored in the storage unit 120. This printer model condition is an example of the claimed first condition. Another one of the examples of printer model conditions described above specifies printer models that were released at least a prescribed number of years earlier. This printer model condition requires that the push notification target users of the printer 200 identified by the printer information PI stored in the storage unit 120 and is an example of the claimed first condition. Further, the examples of the firmware version condition and residual ink condition described above require that the state of the printer 200 identified by the printer information PI correspond to a prescribed state required for outputting the push notification and are examples of the claimed second condition. Further, the example of the terminal location condition described above requires that the distance between the position identified by location information stored when the printer information PI was received (first location information) and the position identified by the location information at the time of executing the notification relevancy determining process (second location information) be no greater than a prescribed value.

After completing the notification relevancy determining process in S310 of FIG. 7, in S320 the CPU 110 determines whether the outputting conditions have been met based on the results of the process in S310. If the outputting conditions have been met (S320: YES), in S322 the CPU 110 executes an outputting process. Specifically, the CPU 110 displays the content of the push notification stored in the storage unit 120 on the display unit 150 and outputs a sound through the sound output unit 130.

However, if the CPU 110 determines that the outputting conditions were not met (S320: NO), in S324 the CPU 110 determines whether the printer model condition among the outputting conditions was met. Here, if the printer model condition was not met, it is not possible that the outputting conditions will be met at a later time. Thus, if the CPU 110 determines that the printer model condition was not met (S324: NO), in S340 the CPU 110 discards (deletes) the push notification stored in the storage unit 120 and subsequently ends the process for received push notifications.

However, if the printer model condition was met, it may be assumed that the outputting conditions were not met in the notification relevancy determining process of S310 because one of the other conditions (firmware version condition, residual ink condition, or terminal location condition) was not met and it is feasible that these outputting conditions could be met at a later time. For example, if the residual ink condition was not met in S310, this condition may be met subsequently as the printer 200 continues to consume ink. Similarly, if the terminal location condition was not met in S310, it is possible that this condition could be met at a later time when the mobile terminal device 100 is moved close to the printer 200. Thus, when the CPU 110 determines that the printer model condition was met (S324: YES), the CPU 110 repeatedly executes the notification relevancy determining process of S310 described above within an effective period, as will be described next. Specifically, in S330 the CPU 110 starts a timer, and in S332 waits until a prescribed time has elapsed. When the prescribed time has elapsed (S332: YES), in S334 the CPU 110 executes an effective period determining process.

Figure 9:
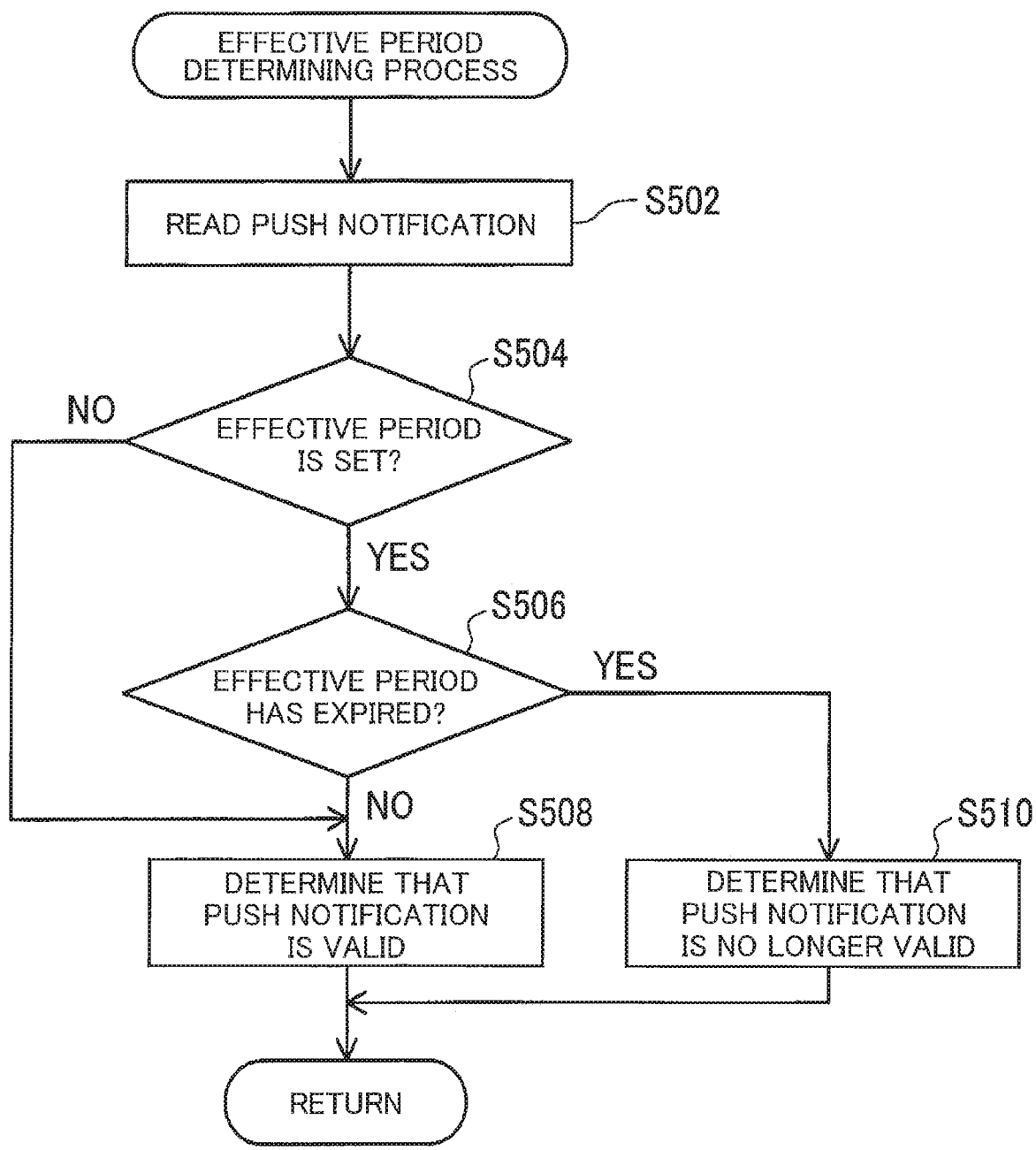
FIG. 9 is a flowchart illustrating steps in an effective period determining process executed by the mobile terminal device.

FIG. 9 is a flowchart illustrating steps in the effective period determining process. In S502 at the beginning of this process, the CPU 110 reads the push notification stored in the storage unit 120. In S504 the CPU 110 determines whether an effective period has been set for the push notification. For example, the management server 400 may set an effective period for the push notification and may include this effective period in the push notification delivery request that the management server 400 issues to the push notification delivery server 300 (S42 of FIG. 3). Alternatively, the push notification delivery server 300 or the mobile terminal device 100 may set an effective period for the push notification. If the CPU 110 determines that an effective period has not been set (S504: NO), in S508 the CPU 110 determines that the push notification falls within its effective period and the push notification is valid. However, if the CPU 110 determines that an effective period has been set (S504: YES), in S506 the CPU 110 determines whether the effective period has expired. If the effective period has not yet expired (S506: NO), in S508 the CPU 110 determines that the push notification is still valid. However, if the CPU 110 determines that the effective period has expired (S506: YES), in S510 the CPU 110 determines that the push notification is no longer valid.

After completing the effective period determining process in S334 of FIG. 7, in S336 the CPU 110 determines whether the push notification is valid based on the results of S334. If the CPU 110 determines that the push notification is still valid (S336: YES), the CPU 110 returns to S304 and repeats the process described above. That is, in S304 the CPU 110 transmits a request to the printer 200 to acquire printer information PI. In S308 the CPU 110 stores the printer information PI in the storage unit 120 when printer information PI was successfully acquired. Thereafter, the CPU 110 repeats the notification relevancy determining process of S310. While it was determined previously in the notification relevancy determining process that the outputting conditions were not met, the states of the mobile terminal device 100 and printer 200 may have changed such that the outputting conditions are now satisfied. In such a case, the CPU 110 may determine that the outputting conditions are met when repeating the notification relevancy determining process.

If the CPU 110 determines in S336 that the push notification is no longer valid (S336: NO) based on the results of the effective period determining process in S334, in S340 the CPU 110 discards (deletes) the push notification stored in the storage unit 120 and ends the process for received push notifications.

A-2-5. Outputting Scenarios for Push Notifications

Figure 10:
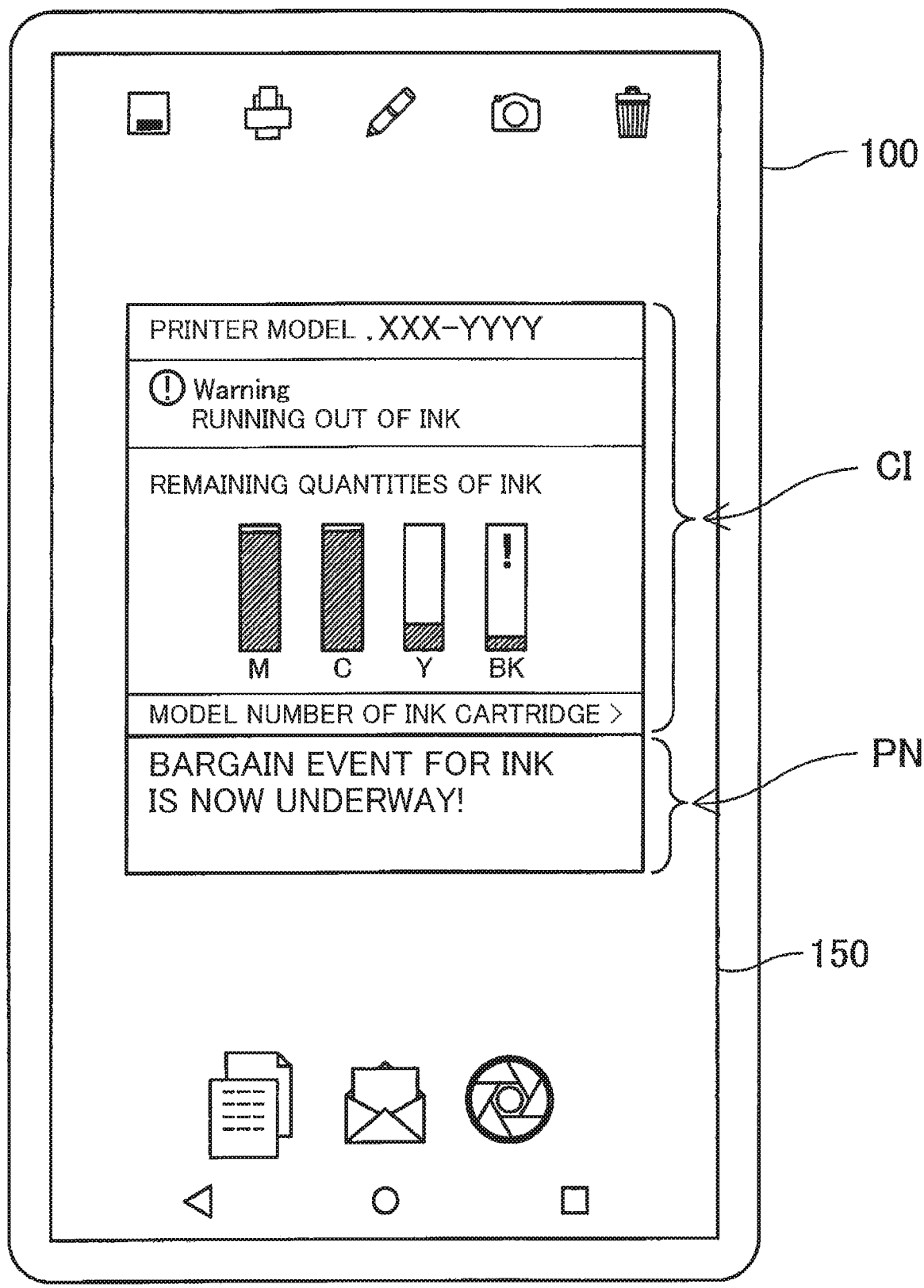
FIG. 10 is an explanatory diagram showing an example of an outputting scenario for a push notification and its appearance on the mobile terminal device.
Figure 11:
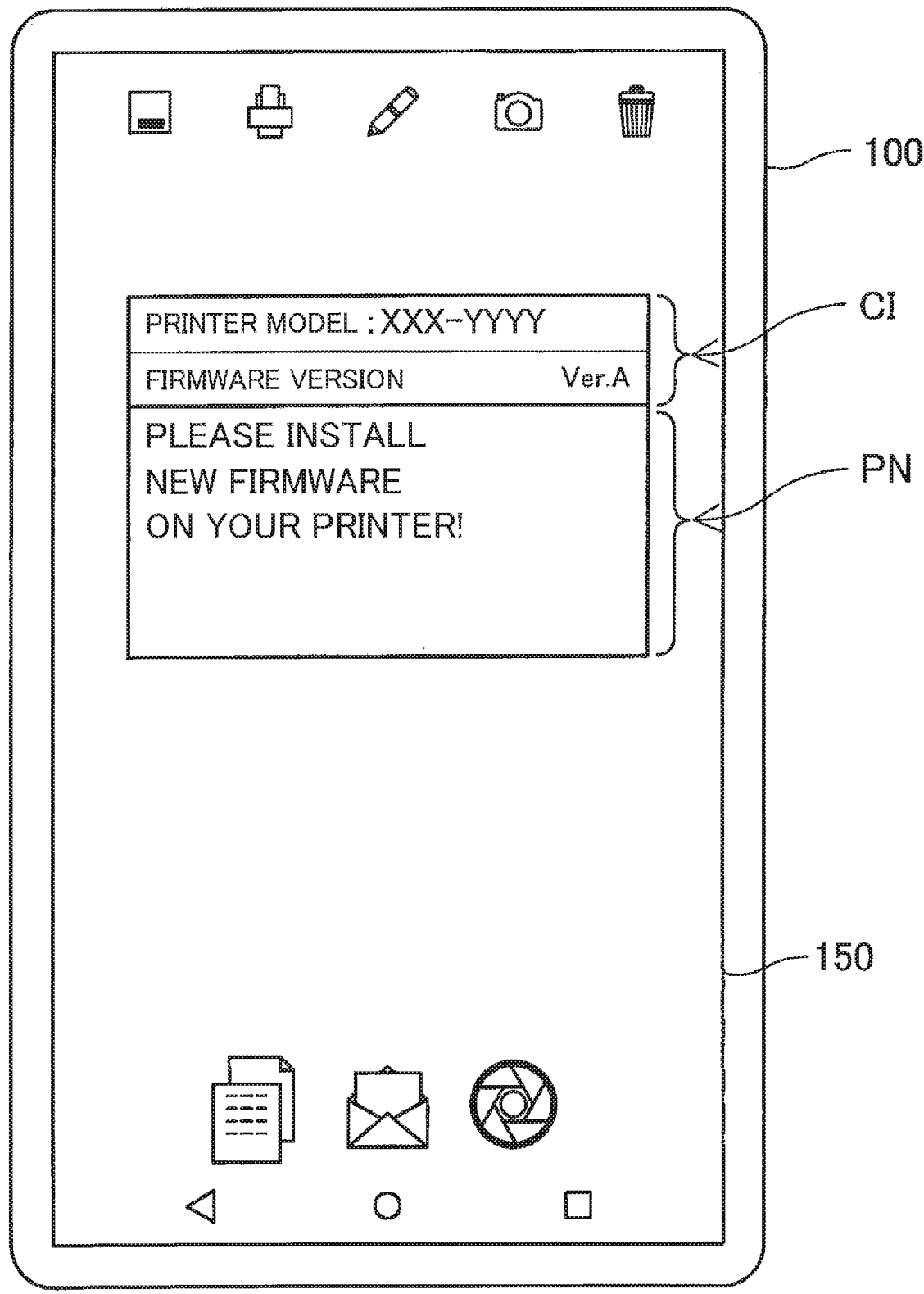
FIG. 11 is an explanatory diagram showing another example of an outputting scenario for a push notification and its appearance on the mobile terminal device.

FIGS. 10 and 11 are explanatory diagrams showing examples of outputting scenarios for push notifications and their appearance on the mobile terminal device 100. In the examples shown in FIGS. 10 and 11, the content of the push notifications (hereinafter called the "push notification content PN") is displayed on the display unit 150 of the mobile terminal device 100. In the example of FIG. 10, the push notification content PN displayed on the display unit 150 is related to a sale on ink (bargain event). Here, the CPU 110 determines that the printer model condition is met since the target printer 200 is a printer model capable of using the ink specified in the push notification content PN, and determines that the residual ink condition is met since the remaining quantity of black (BK) ink in the target printer 200 is low. Accordingly, the CPU 110 determines that the outputting conditions have been met and outputs (displays) the notification. In the example of FIG. 11, the push notification content PN displayed on the display unit 150 is concerned with upgrading the version of the printer firmware. In this case, the CPU 110 determines that the printer model condition is met since the target printer 200 matches a model targeted in the push notification, and determines that the firmware version condition is met since the firmware version of the target printer 200 is one of the versions targeted by the push notification. Accordingly, the CPU 110 determines that the outputting conditions are met and outputs the notification.

In the examples of FIGS. 10 and 11, the display on the display unit 150 includes information related to the outputting conditions (hereinafter called "condition information CI") together with the push notification content PN. The condition information CI displayed in the example of FIG. 10 includes information specifying the printer model, information specifying the quantity of ink remaining for each ink color, and information indicating that the quantity of residual ink is low for at least one color. The condition information CI displayed in the example of FIG. 11 includes information specifying the printer model, and information specifying the firmware version.

A-3. Effects of the Embodiment

The CPU 110 of the mobile terminal device 100 according to the present embodiment described above performs a process to receive a push notification from the push notification delivery server 300 via the communication interface 160 through a function implemented by the OS (S52 of FIG. 3); performs a notification relevancy determining process through a function implemented by the printer control application to determine whether outputting conditions have been met, including the printer model condition (S406 of FIG. 8) requiring that the push notification target the user of the printer 200 identified by the printer information PI stored in the storage unit 120 (S310 of FIG. 7); and executes the outputting process (S322 of FIG. 7) for outputting the push notification via the display unit 150 and sound output unit 130 when the outputting conditions were found to be met in the notification relevancy determining process. Accordingly, through the printer control application of the present embodiment, the mobile terminal device 100 can selectively output push notifications that target the user of the printer 200 identified in the printer information PI and can selectively output notifications having high relevance or urgency to the user. In this way, the mobile terminal device 100 reduces the feeling of annoyance that a user experiences with push notifications while preventing the user from overlooking push notifications having high relevance or urgency.

Through a function implemented by the printer control application according to the present embodiment, the CPU 110 of the mobile terminal device 100 performs the notification relevancy determining process (S310 of FIG. 7) to determine whether outputting conditions are met, including the printer model condition (S406 of FIG. 8) requiring that the push notification be related to the model of the printer 200 identified in the printer information PI stored in the storage unit 120, and executes the outputting process (S322 of FIG. 7) to output the push notification when the outputting conditions were found to be met in the notification relevancy determining process. Hence, through the printer control application of the present embodiment, the mobile terminal device 100 can selectively output push notifications related to the model of the printer 200 identified in the printer information PI and can selectively output push notifications having high relevance or urgency to the user.

Through a function implemented by the printer control application according to the present embodiment, the CPU 110 of the mobile terminal device 100 executes a request transmission process (S208 of FIG. 5 and S304 of FIG. 7) for transmitting a request to the printer 200 via the communication interface 160 to acquire printer information PI; an information reception process (S210 of FIG. 5 and S306 of FIG. 7) for receiving printer information PI from the printer 200 via the communication interface 160 in response to the acquisition request; and a storing process (S212 of FIG. 5 and S308 of FIG. 7) for storing the received printer information PI in the storage unit 120. Hence, through the printer control application according to the embodiment, the mobile terminal device 100 can determine whether the outputting conditions are met using the printer information PI received from the printer 200 and stored in the storage unit 120, thereby suitably selecting push notifications having high relevance or urgency to the user.

Through a function implemented by the printer control application according to the present embodiment, the CPU 110 of the mobile terminal device 100 can perform the notification relevancy determining process (S310 of FIG. 7) to determine whether outputting conditions are met, including the residual ink condition and firmware version condition (S414 and S424 of FIG. 8) requiring that the state of the printer 200 identified in the printer information PI correspond to a prescribed state for outputting the push notification; and the outputting process (S322 of FIG. 7) to output the push notification when determining that the outputting conditions were met in the notification relevancy determining process. Hence, through the printer control application of the present embodiment, the mobile terminal device 100 can selectively output push notifications targeting users of the printer 200 identified by the printer information PI when the printer 200 is in a prescribed state for outputting the push notification, and can selectively output push notifications having high relevance or urgency to the user at a suitable timing.

Through a function implemented by the printer control application according to the present embodiment, the CPU 110 of the mobile terminal device 100 repeats execution of the notification relevancy determining process (S310 of FIG. 7) when the printer model condition were met (S324 of FIG. 7: YES) but the residual ink condition or firmware version condition was not met (S320 of FIG. 7: NO). Hence, through the printer control application in the present embodiment, the mobile terminal device 100 can selectively output push notifications having high relevance or urgency at a suitable timing in response to changes in the state of the printer 200 identified by the printer information PI.

Through a function implemented by the printer control application according to the present embodiment, the CPU 110 of the mobile terminal device 100 determines whether the effective period set for the push notification has expired (S334 of FIG. 7) and executes a discarding process (S340 of FIG. 7: YES) to discard the push notification when determining that the push notification is no longer valid (S336 of FIG. 7: NO). Hence, through the printer control application of the present embodiment, the mobile terminal device 100 can suppress accumulation of push notifications having low relevance or urgency to the user.

Through a function implemented by the printer control application according to the present embodiment, the CPU 110 of the mobile terminal device 100 can perform a process to transmit a printer information acquisition request upon receiving a push notification (S304 of FIG. 7) and uses the latest printer information PI stored in the storage unit 120 for determinations in the notification relevancy determining process (S310 of FIG. 7). Hence, through the printer control application of the present embodiment, the mobile terminal device 100 can perform the notification relevancy determining process using printer information PI identifying the most recent state of the printer 200, and can selectively output push notifications having high relevance or urgency to the user at a more suitable timing.

Through a function implemented by the printer control application according to the present embodiment, the CPU 110 of the mobile terminal device 100 performs a process to transmit a printer information acquisition request (S208 of FIG. 5) after performing a command transmitting process (S222 of FIG. 5) to transmit a command to the printer 200 for controlling the printer 200 (a print command, for example), and uses the printer information PI most recently stored in the storage unit 120 for determinations in the notification relevancy determining process (S310 of FIG. 7). Hence, through the printer control application of the present embodiment, the mobile terminal device 100 can perform the notification relevancy determining process using the printer information PI identifying the state of the printer 200 after executing a process for controlling the printer 200 and can selectively output push notifications having high relevance or urgency to the user at a more suitable timing.

Through a function implemented by the printer control application according to the present embodiment, the CPU 110 of the mobile terminal device 100 performs a request transmission process (S208 of FIG. 5) to transmit a printer information acquisition request to the printer 200 via the communication interface 160; an information reception process (S210 of FIG. 5) to receive printer information PI transmitted from the printer 200 via the communication interface 160 in response to the acquisition request; a location information acquisition process (S214 of FIG. 5) for controlling the location information acquisition unit 170 to acquire location information at the time the printer information PI was received (the first location information); a storing process (S216 of FIG. 5) for storing the received printer information PI in the storage unit 120 in association with the first location information; and a location information acquisition process (S434 of FIG. 8) for controlling the location information acquisition unit 170 to acquire location information at the time the notification relevancy determining process (S310 of FIG. 7) was executed (the second location information). Further, the CPU 110 performs the notification relevancy determining process (S310 of FIG. 7) for determining whether outputting conditions are met, including the terminal location condition (S436 of FIG. 8) requiring that the distance between the position identified by the second location information and the position identified by the first location information be no greater than a prescribed value; and executes the outputting process (S322 of FIG. 7) to output the push notification when determining in the notification relevancy determining process that the outputting conditions are met. Hence, through the printer control application of the present embodiment, the mobile terminal device 100 can selectively output push notifications targeting the user of the printer 200 when estimating that the mobile terminal device 100 is positioned relatively close to the printer 200 and can selectively output push notifications having high relevance or urgency to the user at a suitable timing.

Further, the CPU 110 of the mobile terminal device 100 according to the present embodiment can output the push notification content PN and the condition information CI related to the outputting conditions in the outputting process (S322 of FIG. 7) through a function implemented by the printer control application. Hence, through the printer control application of the present embodiment, the mobile terminal device 100 can notify the user that the push notification is being outputted because the outputting conditions have been met and can thereby prevent the user from missing push notifications that are highly relevant or urgent to the user.

B. Variations of the Embodiment

While the description has been made in detail with reference to specific embodiment, it would be apparent to those skilled in the art that many modifications and variations may be made thereto.

The structure of the information processing system 10 according to the embodiment described above is merely one example and various modifications are possible. For example, communication between devices in the information processing system 10 according to the embodiment is not limited to wired or wireless LAN, NFC, and the like, but may be implemented through other communicating means, such as USB or Bluetooth (Bluetooth is the registered trademark of Bluetooth SIG). Further, while the mobile terminal device 100 is provided with the location information acquisition unit 170 in the present embodiment, the location information acquisition unit 170 may be omitted.

Further, the mobile terminal device 100 may be configured to control a plurality of printers 200. In this case, the mobile terminal device 100 would acquire printer information PI (see FIG. 6) from each of the printers 200 and store the printer information PI for each printer 200 in the storage unit 120.

In the embodiment described above, the printer 200 is given as an example of the target device controlled by the mobile terminal device 100, but the device controlled by the mobile terminal device 100 may be a device other than the printer 200.

Steps in the push notification delivery and outputting process (FIG. 3) and its sub-processes (FIGS. 4, 5, 7, 8, and 9) in the embodiment are merely one example. Some of the steps in these processes may be omitted or modified, and the steps may be reordered. For example, the outputting conditions may include just one of the firmware version condition, residual ink condition, and terminal location condition described in the embodiment.

Further, in the printer information storing process described in the embodiment (FIG. 5), the CPU 110 transmits a printer information acquisition request (S208) after transmitting a print command (S222), but the CPU 110 may transmit the print command at the same time as the printer information acquisition request. With this method, the mobile terminal device 100 can still perform the notification relevancy determining process using printer information PI identifying the state of the printer 200 after a control process has been executed for the printer 200 and can selectively output push notifications having high relevance or urgency to the user at a more suitable timing.

Further, when printer information PI is stored in the storage unit 120 of the mobile terminal device 100 for a plurality of printers 200 in the process for received push notifications according to the present embodiment (FIG. 7), the CPU 110 may execute the notification relevancy determining process (S310 of FIG. 7; FIG. 8) for each of the plurality of printers 200. Further, in this case the CPU 110 may determine that the printer model condition is met in S324 when the printer model condition is met for at least one printer 200.

In the embodiment described above, part of the structure implemented in hardware may be replaced with software and, conversely, part of the structure implemented in software may be replaced with hardware.

What is claimed is:

1. A non-transitory computer readable storage medium storing a set of program instructions for a mobile terminal device, the mobile terminal device comprising: a communication interface; a computer; and a memory storing an operating system configured to cause the mobile terminal device to perform receiving a push notification transmitted from a server via the communication interface, the set of program instructions, when executed by the computer, causing the mobile terminal device to perform:
    determining, based on the push notification received from the server and device information stored in the memory, whether the push notification received from the server includes prescribed information corresponding to the device information, the device information specifying a specific device and being stored in the memory before the push notification is received from the server; and
    in response to determining that the push notification received from the server includes the prescribed information, displaying the push notification,
    wherein the displaying the push notification received from the server is skipped in a case where the determining determines that the push notification received from the server does not include the prescribed information corresponding to the device information specifying the specific device and stored in the memory of the mobile terminal device before the push notification is received.

2. The non-transitory computer readable storage medium according to claim 1, wherein the device information specifies a model of the specific device.

3. The non-transitory computer readable storage medium according to claim 1, wherein the set of program instructions, when executed by the computer, causes the mobile terminal device to further perform:
    transmitting to the specific device an acquisition request to acquire the device information via the communication interface;
    receiving the device information, transmitted from the specific device, via the communication interface in response to the acquisition request; and
    storing the device information in the memory.

4. The non-transitory computer readable storage medium according to claim 3, wherein the set of program instructions, when executed by the computer, causes the mobile terminal device to perform determining whether the device information indicates that the specific device is under a prescribed state required for outputting the push notification.

5. The non-transitory computer readable storage medium according to claim 4, wherein the determining is repeatedly performed in response to determining that the push notification received from the server includes the prescribed information and the device information does not indicate that the specific device is under the prescribed state.

6. The non-transitory computer readable storage medium according to claim 5, wherein the set of program instructions, when executed by the computer, causes the mobile terminal device to further perform:
    determining whether an effective period for displaying the push notification has expired; and
    discarding the push notification in response to determining that the effective period has expired.

7. The non-transitory computer readable storage medium according to claim 3, wherein the acquisition request is transmitted in response to at least receiving the push notification; and
    wherein the determining is performed using latest device information stored in the memory.

8. The non-transitory computer readable storage medium according to claim 3, wherein the set of program instructions, when executed by the computer, causes the mobile terminal device to further perform:
    transmitting to the specific device a command to control the specific device via the communication interface;
    wherein the acquisition request is transmitted at the same time as transmitting the command or after transmitting the command; and
    wherein the determining is performed using latest specific device information stored in the memory.

9. A non-transitory computer readable storage medium storing a set of program instructions for a mobile terminal device, the mobile terminal device comprising: a communication interface; a computer; and a memory storing an operating system configured to cause the mobile terminal device to perform receiving a push notification transmitted from a server via the communication interface, the set of program instructions, when executed by the computer, causing the mobile terminal device to perform:
- (a) transmitting to a specific device an acquisition request to acquire device information specifying the specific device via the communication interface;
- (b) receiving the device information, transmitted from the specific device, via the communication interface in response to the acquisition request;
- (c) acquiring first location information identifying a position of the mobile terminal device at a timing of the (b) receiving;
- (d) storing the device information in association with the first location information in the memory;
- (e) determining whether the push notification targets a user of the specific device specified by the device information stored in the memory;
- (f) acquiring second location information identifying a position of the mobile terminal device at a timing of the (e) determining in response to determining that a first condition is met;
- (g) acquiring moved distance between the position of the mobile terminal device at the timing of the (b) receiving and the position of the mobile terminal device at the timing of the (e) determining;
- (h) determining whether the moved distance between the position of the mobile terminal device at the timing of the (b) receiving and the position of the mobile terminal device at the timing of the (e) determining is smaller than a prescribed value; and
- (i) outputting the push notification in response to determining that the moved distance between the position of the mobile terminal device at the timing of the (b) receiving and the position of the mobile terminal device at the timing of the (e) determining is smaller than the prescribed value.

10. The non-transitory computer readable storage medium according to claim 1, wherein the push notification is displayed along with information related to the prescribed information.

11. A mobile terminal device comprising:
- a communication interface configured to receive a push notification transmitted from a server;
- a processor; and
- a memory storing device information and a set of computer-readable instructions therein, the device information specifying a specific device, and the set of computer-readable instructions, when executed by the processor, causing the mobile terminal device to perform:
  - determining, based on the push notification received from the server and the device information stored in the memory before the push notification is received from the server, whether the push notification received from the server includes prescribed information corresponding to the device information; and
  - in response to determining that the push notification received from the server includes the prescribed information, displaying the push notification,
  - wherein the displaying the push notification received from the server is skipped in a case where the determining determines that the push notification received from the server does not include the prescribed information corresponding to the device information specifying the specific device and stored in the memory of the mobile terminal device before the push notification is received.

* * * * *